(12) United States Patent
Meghani et al.

(10) Patent No.: US 11,038,978 B2
(45) Date of Patent: Jun. 15, 2021

(54) METHOD, APPARATUS, COMPUTER PROGRAM PRODUCT, COMPUTER READABLE STORAGE MEDIUM, INFORMATION PROCESSING APPARATUS AND SERVER FOR PERFORMING BROWSER REDIRECTIONS USING FIXED VALUE COOKIES

(71) Applicant: IPCO 2012 LIMITED, London (GB)

(72) Inventors: Chinmay Meghani, London (GB); Richard Henderson, London (GB)

(73) Assignee: IPCO 2012 LIMITED, London (GB)

( * ) Notice: Subject to any disclaimer, the term of this patent is extended or adjusted under 35 U.S.C. 154(b) by 21 days.

(21) Appl. No.: 16/310,092

(22) PCT Filed: Jun. 21, 2017

(86) PCT No.: PCT/GB2017/051817
§ 371 (c)(1),
(2) Date: Dec. 14, 2018

(87) PCT Pub. No.: WO2018/002584
PCT Pub. Date: Jan. 4, 2018

(65) Prior Publication Data
US 2019/0253512 A1    Aug. 15, 2019

(30) Foreign Application Priority Data
Jun. 30, 2016    (GB) ..................... 1611393

(51) Int. Cl.
*H04L 29/08*    (2006.01)

(52) U.S. Cl.
CPC .......... *H04L 67/2814* (2013.01); *H04L 67/02* (2013.01); *H04L 67/146* (2013.01); *H04L 67/20* (2013.01)

(58) Field of Classification Search
CPC ... H04L 67/2814; H04L 67/146; H04L 67/20; H04L 67/02; H04L 67/22
See application file for complete search history.

(56) References Cited

U.S. PATENT DOCUMENTS

| | | | |
|---|---|---|---|
| 7,730,532 B1 * | 6/2010 | Yeo .................... | G06F 16/9535 726/22 |
| 10,218,666 B1 * | 2/2019 | Rosenshine .......... | G06Q 10/107 |
| 10,291,722 B1 * | 5/2019 | Mendez .............. | H04L 65/4015 |

(Continued)

FOREIGN PATENT DOCUMENTS

| | | |
|---|---|---|
| EP | 2838061 A1 | 2/2015 |
| WO | 2016071525 A1 | 5/2016 |

OTHER PUBLICATIONS

PCT International Search Report and Written Opinion, Application No. PCT/GB2017/051817, dated Aug. 11, 2017, 6 pps.

*Primary Examiner* — Michael Won
(74) *Attorney, Agent, or Firm* — Armstrong Teasdale LLP

(57) ABSTRACT

A method of performing a redirect in a browser viewing a page in a first-party domain is provided. The method includes the steps of checking for the presence of a cookie in the browser associated with a third-party domain, and in the absence of the third-party cookie, the method includes redirecting the browser from the first-party domain to the third-party domain and, in response, returning from the third-party domain, a fixed value cookie for storage in the browser.

16 Claims, 4 Drawing Sheets

(56) References Cited

U.S. PATENT DOCUMENTS

| | | | | |
|---|---|---|---|---|
| 10,404,662 | B1* | 9/2019 | Ben-Dor | H04L 67/20 |
| 2001/0054155 | A1* | 12/2001 | Hagan | G06Q 20/4014 |
| | | | | 713/193 |
| 2002/0143798 | A1* | 10/2002 | Lisiecki | H04L 67/1095 |
| 2004/0002878 | A1* | 1/2004 | Maria Hinton | G06Q 20/3821 |
| | | | | 705/76 |
| 2004/0015580 | A1* | 1/2004 | Lu | G06F 16/9535 |
| | | | | 709/224 |
| 2006/0265495 | A1* | 11/2006 | Butler | H04L 67/22 |
| | | | | 709/224 |
| 2009/0024737 | A1* | 1/2009 | Goldspink | G06F 11/3495 |
| | | | | 709/224 |
| 2009/0024748 | A1* | 1/2009 | Goldspink | G06F 16/958 |
| | | | | 709/228 |
| 2009/0063491 | A1* | 3/2009 | Barclay | G06Q 30/02 |
| 2009/0083442 | A1* | 3/2009 | Sutter | H04L 67/142 |
| | | | | 709/248 |
| 2009/0292803 | A1 | 11/2009 | Schneider | |
| 2010/0049790 | A1* | 2/2010 | Schreiber | G06F 9/454 |
| | | | | 709/203 |
| 2010/0145960 | A1 | 6/2010 | Casteel et al. | |
| 2012/0317271 | A1* | 12/2012 | Funk | H04N 21/44222 |
| | | | | 709/224 |
| 2013/0104024 | A1* | 4/2013 | Rajkumar | G06F 16/70 |
| | | | | 715/234 |
| 2014/0351405 | A1 | 11/2014 | Brown | |
| 2015/0088975 | A1* | 3/2015 | Wei | H04L 67/42 |
| | | | | 709/203 |
| 2015/0169784 | A1* | 6/2015 | Anderson | H04L 69/329 |
| | | | | 707/756 |
| 2016/0098765 | A1* | 4/2016 | Ishida | G06Q 30/0275 |
| | | | | 705/14.71 |
| 2019/0050910 | A1* | 2/2019 | Demsey | H02J 9/00 |
| 2019/0073692 | A1* | 3/2019 | Saravanan | G06F 21/6254 |
| 2019/0253512 | A1* | 8/2019 | Meghani | H04L 67/02 |

* cited by examiner

METHOD, APPARATUS, COMPUTER PROGRAM PRODUCT, COMPUTER READABLE STORAGE MEDIUM, INFORMATION PROCESSING APPARATUS AND SERVER FOR PERFORMING BROWSER REDIRECTIONS USING FIXED VALUE COOKIES

CROSS REFERENCE TO RELATED APPLICATIONS

This patent application is a National Stage Entry of PCT/GB2017/051817 filed on Jun. 21, 2017, which claims the benefit and priority of Great Britain Patent Application No. 1611393.8 filed on Jun. 30, 2016, the disclosures of which are incorporated herein by reference in their entirety as part of the present application.

BACKGROUND

The present disclosure relates to a method, apparatus, computer program product, computer readable storage medium, information processing apparatus, and server.

The "background" description provided herein is for the purpose of generally presenting the context of the disclosure. Work of the presently named inventors, to the extent it is described in the background section, as well as aspects of the description which may not otherwise qualify as prior art at the time of filing, are neither expressly or impliedly admitted as prior art against the present disclosure.

Recent legislation has meant that a user must consent to storage of third-party cookies. An example of such legislation is EU Directive 2002/58 on Privacy and Electronic Communications. This legislation requires that a third-party cookie can only be automatically sent and received if it has first been stored as a first party cookie.

In order to comply with this legislation, a known technique is described with reference to FIG. 4. The known flowchart 400 starts at step 402. The user visits a website by either clicking on a link or typing the address into the browser such as www.amazon.com. This provides a homepage for a first-party domain. This is step 404. If the Amazon website wishes to use a third-party cookie (i.e. a cookie not linked to the first-party domain), the user will be asked if they consent to storing their cookie data across multiple websites. This is step 406 and is called a "first-party redirect". If the user does not consent, then the "no" path is followed and the process ends at step 412. Alternatively, if the user does consent, then the "yes" path is followed and the process moves to step 408.

In step 408, after the user gives consent, the browser is re-directed to a third-party website (such as www.zapp.com) where the cookie for the user is calculated. In other words, the browser of the user is re-directed to a third-party domain which is associated with the cookie. In the third-party website, the cookie is calculated and set specifically for the user and returned to the user. This is step 410. The process for setting the cookie then ends at step 412 and the browser is redirected back to the first-party domain.

Once the cookie is set for the user, the legislation allows the cookie to be automatically updated.

However, this mechanism presents technical problems. Firstly, the redirect to the third party domain in steps 408 and 410 requires additional infrastructure for the third-party domain. This is because a proportion of the third-party domain needs to be dedicated to calculating and setting the cookie for the individual user. This proportion is usually very large requiring dedicated servers to perform the calculation for each first-party redirect.

Secondly, given the amount of infrastructure required, the third-party domains are usually located in one place as it would require large amounts of investment to distribute the third-party domains geographically. This means that the time taken to return the cookie to the user and to perform the re-direct back to the first-party domain is increased, especially when the third-party domain is located in a geographical location far from the user's browser.

It is an aim of embodiments of the disclosure to address at least one of these technical problems.

BRIEF DESCRIPTION

One embodiment of the present disclosure provides a method of performing a redirect in a browser viewing a page in a first-party domain, including the steps of checking for the presence of a cookie in the browser associated with a third-party domain, and in the absence of the third-party cookie, the method includes redirecting the browser from the first-party domain to the third-party domain and, in response, returning from the third-party domain, a fixed value cookie for storage in the browser.

In the event of the presence of the fixed third-party cookie, the method may further include retrieving the fixed value cookie from the browser, calculating a persistent third-party cookie in response to retrieving the fixed value cookie and providing the persistent cookie to the browser for storage therein.

The persistent cookie may include information identifying the user of the browser.

The fixed value cookie may contain information identifying the first-party domain from which the redirect occurred.

The method may further include counting the number of occurrences of fixed value cookies associated with each of the first-party domains.

Another embodiment of the present disclosure provides a computer program product including computer readable instructions which, when loaded onto a computer, configures the computer to perform a method according to any embodiment.

Another embodiment of the present disclosure provides a computer readable storage medium configured to store the computer program product therein or thereon.

Another embodiment of the present disclosure provides an information processing apparatus including a controller configured to perform a redirect in a browser viewing a page in a first-party domain, the redirect including the steps of checking for, within storage, the presence of a cookie in the browser associated with a third-party domain, and in the absence of the third-party cookie, control a communication unit to redirect the browser from the first-party domain to the third-party domain and, in response, receiving from the third-party domain, a fixed value cookie, and storing the fixed value cookie in the storage.

In the event of the presence of the fixed third-party cookie, the controller may be configured to retrieve the fixed value cookie from the browser, calculate a persistent third-party cookie in response to retrieving the fixed value cookie, and provide the persistent cookie to the browser for storing within the storage.

The persistent cookie may include information identifying the user of the browser.

The fixed value cookie may contain information identifying the first-party domain from which the redirect occurred.

Another embodiment of the present disclosure provides a server including a controller configured to control a communication unit to receive a redirect of a browser from a first-party domain and, in response, return a fixed value cookie for storage in the browser.

In the event of the presence of the fixed third-party cookie, the controller may be configured to receive the fixed value cookie from the browser via the communication unit, calculate a persistent third-party cookie in response to retrieving the fixed value cookie, and provide the persistent cookie to the browser, via the communication unit, for storage therein.

The persistent cookie may include information identifying the user of the browser.

The fixed value cookie may contain information identifying the first-party domain from which the redirect occurred.

The controller in the server may be configured to count the number of occurrences of fixed value cookies associated with each of the first-party domains.

The foregoing paragraphs have been provided by way of general introduction, and are not intended to limit the scope of the following claims. The described embodiments, together with further advantages, will be best understood by reference to the following detailed description taken in conjunction with the accompanying drawings.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DETAILED DESCRIPTION

Figure 1:
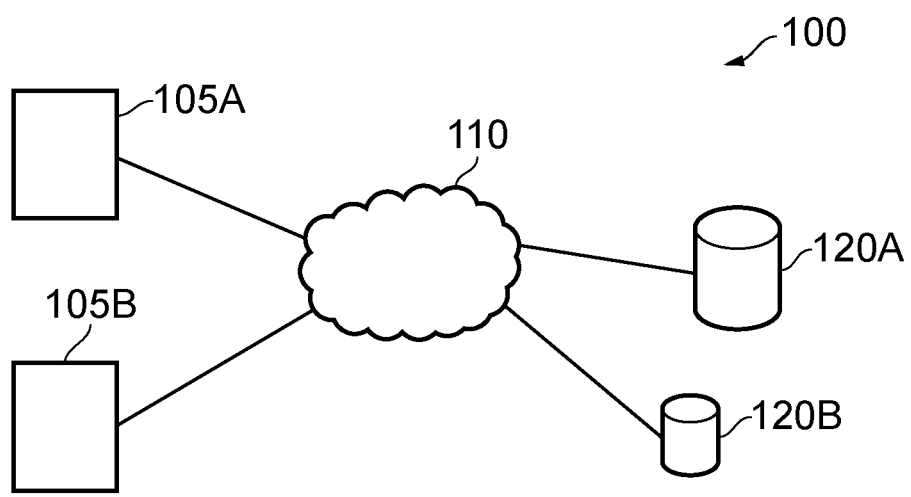
FIG. 1 describes a system according to one embodiment of the present disclosure.

Referring now to the drawings, wherein like reference numerals designate identical or corresponding parts throughout the several views.

FIG. 1 describes a system 100 according to embodiments of the disclosure. The system 100 includes a first client device 105A and a second client device 105B. Whilst the first client device 105A and the second client device 105B may both be the same type of device, in embodiments, they may be different types of device. For example, the first client device 105A and/or second client device 105B may be a smartphone, tablet computer, laptop computer, or desktop computer. Indeed, the client devices may be any kind of information processing device.

The first client device 105A and the second client device 105B are connected to a wide area network, such as the Internet 110. This may be over a network such as a cellular network or a WiFi network.

Additionally connected to the Internet 110 are a first server 120A and a second server 120B. In the following, the first server 120A is referred to as the first-party domain and the second server 120B is referred to as a third-party domain. The geographical separation between the first-party domain and the second-party domain is sometimes, and usually, large.

Figure 2:
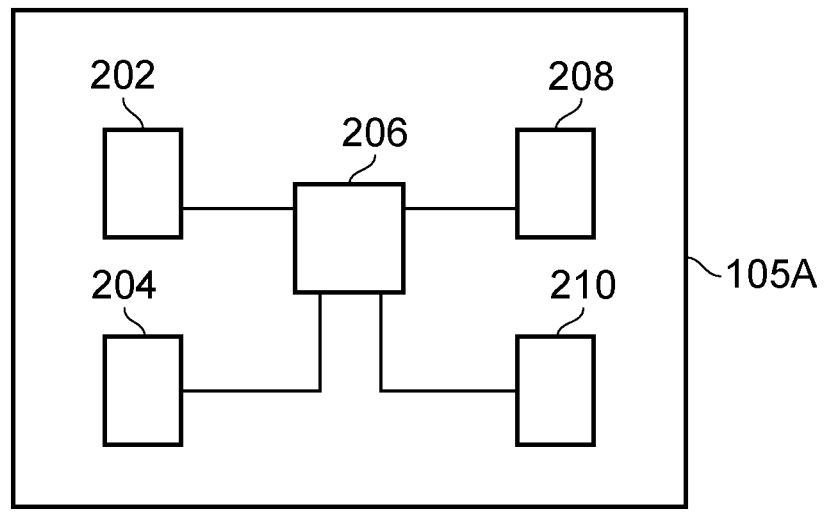
FIG. 2 describes a client device used in the system of FIG. 1.

FIG. 2 describes the first client device 105A according to embodiments of the disclosure. It is envisaged that the second client device 105B will have identical features to that of the first client device 105A and so will not be described in any detail hereinafter.

The first client device 105A includes a client communication unit 202. The client communication unit 202 communicates with the internet 110 either directly or indirectly. In other words, the client communication unit 202 may communicate using a wireless cellular network using the 3G or LTE Standards, or may communicate with the Internet 110 using a local area network. This may be achieved using a wireless protocol such as WiFi or using a wired connection such as Ethernet.

The client communication unit 202 is connected to a client central processing unit (client CPU) 206. The client CPU 206 contains circuitry whose operation is controlled using computer software. The computer software contains computer readable instructions which, when loaded onto a computer, configures the CPU and even the client device to perform certain method steps according to embodiments of the disclosure.

The computer program as well as other computer code, such as a cookie for a website, is stored on client memory 204. The cookie may be stored in a browser, such as Microsoft®, Internet Explorer®, Google® Chrome®, or Apple® Safari®. The client memory 204 is connected to the client CPU 206. The client memory 204 may be any kind of memory including but not limited to solid state memory, optically readable memory, magnetically readable memory, or any kind of computer readable memory.

The client CPU 206 is also connected to a client display unit 208 and a client input unit 210. In embodiments of the disclosure, the first client device 105A is a smartphone. Therefore, in this case, the client display unit 208 is a screen and the client input device 210 is a touch screen layer mounted on the screen. The user then controls the operation of the first client device 105A by touching the screen. Of course, if the first client device 105A is embodied differently, such as being a laptop, the client input device 210 may be a mouse or trackball and the client display unit 208 may be a connection to a monitor (not shown). The disclosure is therefore not limited.

Figure 3:
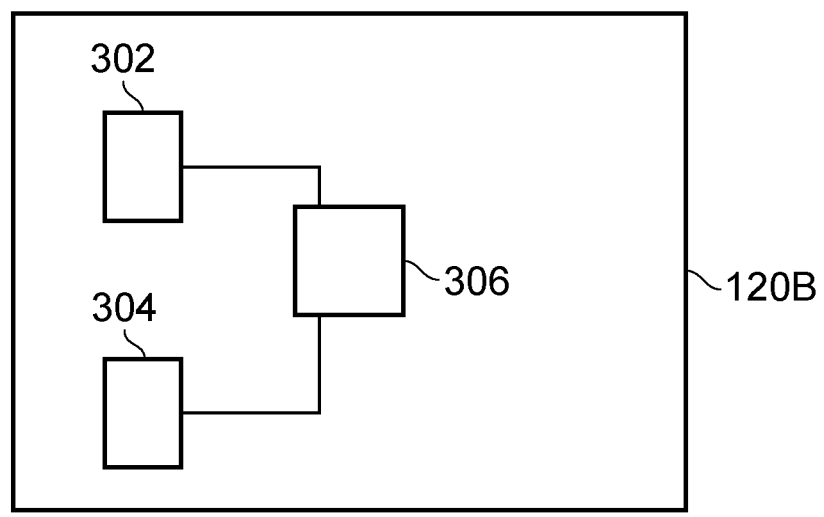
FIG. 3 describes a server device used in the system of FIG. 1.
Figure 4:
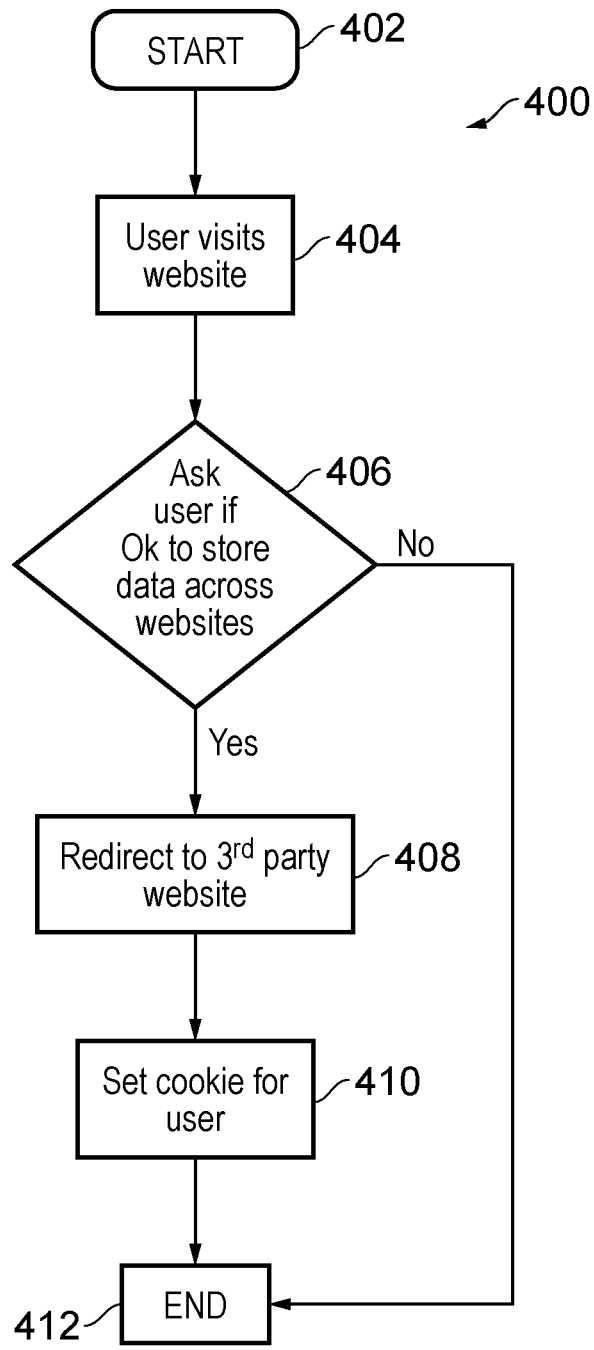
FIG. 4 describes a known mechanism for a first-party redirect.

An example of a server provided in the third-party domain 120B is shown in FIG. 3. As the server in the first-party domain is structurally identical to the server in the third-party domain 120B, the server for the first-party domain will not be described for brevity.

The server for the third-party domain 120B includes a server communication unit 302. The server communication unit 302 communicates with the internet 110 either directly or indirectly, via a local network. Indeed, the server for the third-party domain 120B may be isolated from all local area networks and may be a standalone server connected to the Internet 110 providing fixed cookies in response to every first-party redirect. This arrangement has the advantage that the remainder of the servers in the third-party domain do not have any other load applied to them when dealing with every first-party redirect.

The server communication unit 302 is connected to a server central processing unit (server CPU) 306. The server CPU 306 contains circuitry whose operation is controlled using computer software. The computer software contains computer readable instructions which, when loaded onto a computer, configures the CPU and even the server of the third-party domain to perform certain method steps according to embodiments of the disclosure.

The computer program as well as other computer code, such as a fixed cookie for each first-party redirect, is stored on server memory 304. The server memory 304 is connected to the server CPU 306. The server memory 304 may be any kind of memory including but not limited to solid state memory, optically readable memory, magnetically readable memory, or any kind of computer readable memory.

Figure 5:
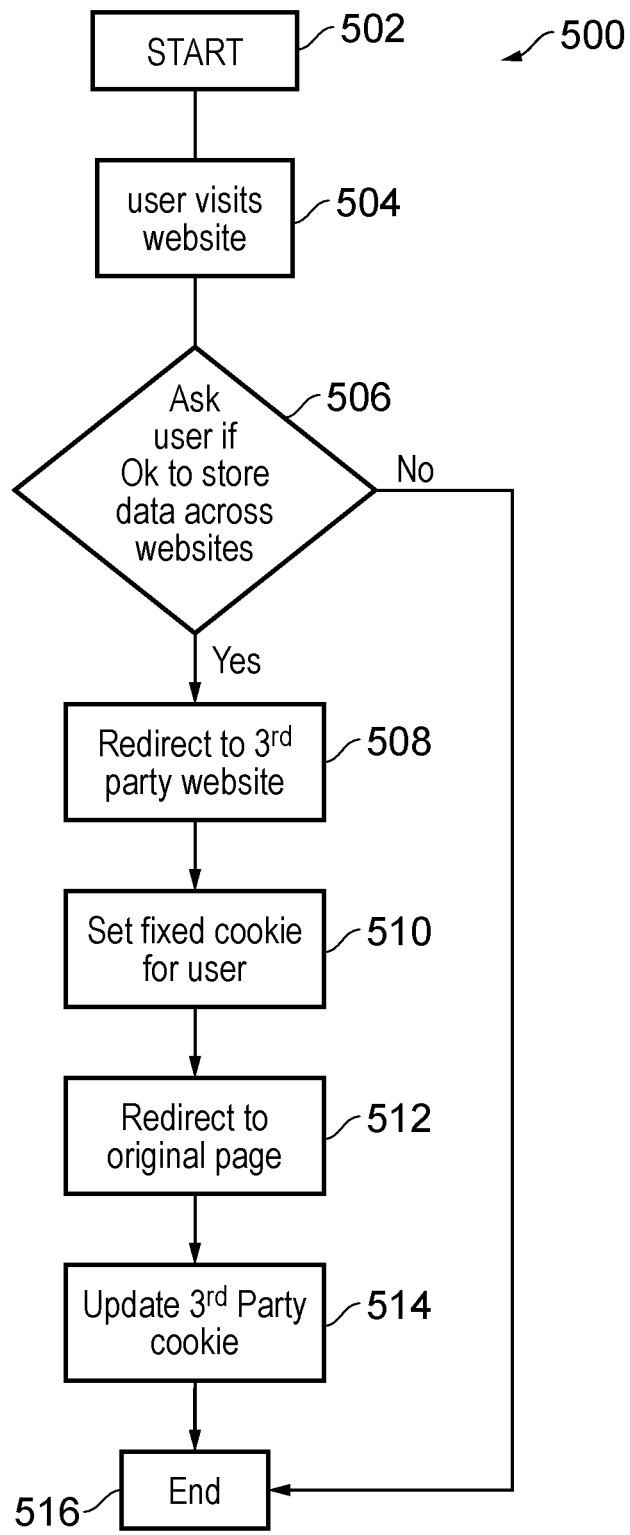
FIG. 5 describes a mechanism for a first-party redirect according to embodiments of the present disclosure.

Referring to FIG. 5, a flowchart 500 describing the operation of an embodiment of the disclosure is shown. The operation starts at step 502. The user visits a website in step 504, such as www.amazon.com by either typing in the webpage into the browser of clicking a link to the webpage. This is a webpage in the first-party domain. The first-party domain may be a merchant selling products for the user to purchase.

Upon visiting the webpage in the first party domain, the browser checks to confirm if a cookie for any third-party domains within the webpage exist within the browser. If there is no cookie stored for the third party domain, the user is asked if he or she consents to storing cookies on their computer which will be used across webpages in multiple domains. This is step 506. If the user does not consent, the "no" path is followed and the process ends at step 516. Alternatively, if the user does consent, the "yes" path is followed and the process moves to step 508.

In step 508, the user will be re-directed to a webpage in a third-party domain. Specifically, in embodiments, the re-direction will be to a specific webpage within the domain that is dedicated to the merchant. As an example, the re-direction will be to www.zapp.com/merchant/amazon-com. So, the third-party domain is zapp.com and the webpage is a specific webpage within the third-party domain. Of course, for other merchants such as amazon.co.uk, or Walmart or the like, the URL of the website within the third-party domain to which the browser will be re-directed changes. So, for example, the re-direction may be to www.zapp.com/merchant/amazoncouk or www.zapp.com/merchant/walmart. In other words, the webpage in the third party domain may be different depending on the identity of the first-party domain. Instead, of course, it may be that all re-directions irrespective of merchant will be sent to the same webpage.

When the user is re-directed to the webpage in the third-party domain, the third-party domain will count the number of instances of the re-direction. So, for example, the third-party domain will count the number of re-directions to www.zapp.com/merchant/amazoncom. This may be the number of visits over a particular timeframe such as hourly or daily, or weekly or the like. Indeed, the timeframe may also be set according to the number of re-directions. For example, if the merchant is producing a particularly high volume of re-directs, the time frame may be the number of re-directions an hour, whereas for merchant having a low volume of re-directions, the timeframe may be the number of re-directions a day. This allows for high levels of granularity when determining which merchants are most effective in promoting the third-party domain and any service they provide.

The process then moves to step 510.

In step 510, the specific webpage within the third-party domain will return a fixed cookie. The fixed cookie is a piece of data having a fixed value. The value of the data does not change and is the same value irrespective of the user. By returning a fixed value cookie to the user's browser, the amount of processing required by the server 120B within the third-party domain is small compared to known techniques where cookies are calculated and returned.

Further, although the cookie is fixed irrespective of the user, the value of the fixed cookie stored at each webpage within the third-party domain for different merchants may vary. For example, when a first-party redirect occurs from amazon.com, the webpage to which the browser is directed may return a fixed cookie that includes a unique identifier for amazon.com in the value of the fixed cookie. An example of the unique identifier may be the domain of the first-party as this, by definition, has to be unique. This allows the original source of the first-party redirect to be established more easily by the third-party domain at a later time. In other words, when the cookie is updated by the third-party domain, the third-party domain will be able to establish from which merchant's website the initial first-party redirection occurred. This makes tracking the source of the first-party redirections easier during the life-time of the cookie.

Further, by providing a fixed cookie, the webpage to which the browser is redirected may be configured to provide only static content. This allows the server 120B of the third-party to have only services required to provide static content enabled. This reduces load on the server or allows a simple server to be provided. Moreover, as only static content services are enabled, this facilitates providing the server 120B at many more geographical locations. Specifically, the server 120B hosting the fixed webpage for a particular first-party domain, such as Amazon.com may be selected to be located near to the geographical location of the server 120A hosting the first-party domain. This further reduces the time taken to provide the first-party redirect.

After the fixed cookie has been returned to the browser, the process moves to step 512 where the browser is redirected back to the original page of the first party domain which in this case is a merchant.

The process then moves to step 514 where the fixed cookie is updated. In this step, the fixed cookie is then updated to include user specific data such as information identifying the user of the browser or any kind of variable data in the known manner. This updating is done automatically and in the background. The process ends at step 516.

In the event that the user of the browser clears their cookies, the updated cookie will be deleted. Accordingly, the process of FIG. 5 will be repeated the next time the browser visits the first-party domain.

By providing a fixed cookie during a first-party redirect, there are numerous technical advantages. Firstly, the amount of processing on the server 120B of the third-party domain is reduced compared with known techniques. Secondly, because the amount of processing is reduced, simpler servers hosting static content can be provided. This enables the servers in the third-party domain handling first-party redirects can be located closer to the server 120A of the first-party domain. This allows the time for the browser to receive the cookie to be shorter allowing the user to be re-directed back to the first-party domain more quickly.

Although the foregoing mentions "cookies", the interpretation intended is any kind of fixed data that indicates to the browser that a first-party redirect has occurred.

Obviously, numerous modifications and variations of the present disclosure are possible in light of the above teachings. It is therefore to be understood that within the scope of the appended claims, the disclosure may be practiced otherwise than as specifically described herein.

In so far as embodiments of the disclosure have been described as being implemented, at least in part, by software-controlled data processing apparatus, it will be appreciated that a non-transitory machine-readable medium carrying such software, such as an optical disk, a magnetic disk, semiconductor memory or the like, is also considered to represent an embodiment of the present disclosure.

It will be appreciated that the above description for clarity has described embodiments with reference to different functional units, circuitry, and/or processors. However, it will be apparent that any suitable distribution of functionality between different functional units, circuitry, and/or processors may be used without detracting from the embodiments.

Described embodiments may be implemented in any suitable form including hardware, software, firmware, or any combination of these. Described embodiments may be implemented at least partly as computer software running on one or more data processors and/or digital signal processors. The elements and components of any embodiment may be physically, functionally, and logically implemented in any suitable way. Indeed the functionality may be implemented in a single unit, in a plurality of units or as part of other functional units. As such, the disclosed embodiments may be implemented in a single unit or may be physically and functionally distributed between different units, circuitry and/or processors.

Although the present disclosure has been described in connection with some embodiments, it is not intended to be limited to the specific form set forth herein. Additionally, although a feature may appear to be described in connection with particular embodiments, one skilled in the art would recognize that various features of the described embodiments may be combined in any manner suitable to implement the technique.

What is claimed is:

1. A method of performing a redirect in a browser viewing a page in a first-party domain, comprising:
   checking, using a computing device, for the presence of a cookie in the browser associated with a third-party domain; and
   in the absence of the third-party cookie:
      redirecting, using the computing device, the browser from the first-party domain to the third-party domain; and
      in response, returning from the third-party domain to the computing device, a fixed value cookie for storage in the browser, wherein the fixed value cookie has the same value irrespective of a user of the browser, and wherein the fixed value cookie includes a unique identifier corresponding to the first-party; and
      updating, at the computing device, the fixed value cookie returned from the third-party domain by adding user specific data identifying the user of the browser to generate an updated cookie, the updated cookie including both the unique identifier from the fixed value cookie and the specific data identifying the user added by the computing device, thereby reducing an amount of processing required by the third-party domain to facilitate the redirect.

2. The method according to claim 1, whereby in the event of the presence of the fixed third-party cookie, the method further comprises retrieving the fixed value cookie from the browser, calculating a persistent third-party cookie in response to retrieving the fixed value cookie, and providing the persistent cookie to the browser for storage therein.

3. The method according to claim 2, wherein the persistent cookie includes information identifying the user of the browser.

4. The method according to claim 2, wherein the fixed value cookie contains information identifying the first-party domain from which the redirect occurred.

5. The method according to claim 4, further comprising counting the number of occurrences of fixed value cookies associated with each of the first-party domains.

6. A computer program product comprising computer readable instructions which, when loaded onto the computing device, configure the computing device to perform the method according to claim 1.

7. A computer readable storage medium configured to store the computer program product of claim 6 thereon.

8. An information processing apparatus comprising:
   a controller configured to:
      perform a redirect in a browser viewing a page in a first-party domain, the redirect comprising:
         checking, within storage, for the presence of a cookie in the browser associated with a third-party domain; and
         in the absence of the third-party cookie:
            controlling a communication unit to redirect the browser from the first-party domain to the third-party domain;
            in response, receiving from the third-party domain, a fixed value cookie, wherein the fixed value cookie has the same value irrespective of a user of the browser, and wherein the fixed value cookie includes a unique identifier corresponding to the first-party;
            updating, at the computing device, the fixed value cookie returned from the third-party domain by adding user specific data identifying the user of the browser to generate an updated cookie, the updated cookie including both the unique identifier from the fixed value cookie and the specific data identifying the user added by the computing device, thereby reducing an amount of processing required by the third-party domain to facilitate the redirect; and
            storing the updated fixed value cookie including the user specific data in the storage.

9. The apparatus according to claim 8, whereby in the event of the presence of the fixed third-party cookie, the controller is configured to retrieve the fixed value cookie from the browser, calculate a persistent third-party cookie in response to retrieving the fixed value cookie, and provide the persistent cookie to the browser for storing within the storage.

10. The apparatus according to claim 9, wherein the persistent cookie includes information identifying the user of the browser.

11. The apparatus according to claim 9, wherein the fixed value cookie contains information identifying the first-party domain from which the redirect occurred.

12. A server comprising a controller configured to control a communication unit to receive a redirect of a browser from a first-party domain and, in response, return a fixed value cookie for storage in the browser, wherein the fixed value cookie has the same value irrespective of a user of the browser, wherein the fixed value cookie includes a unique identifier corresponding to the first-party, and wherein the fixed value cookie is updated by adding user specific data identifying the user of the browser to generate an updated cookie, the fixed value cookie updated subsequent to the communication unit returning the fixed value cookie, the updated cookie including both the unique identifier from the fixed value cookie and the specific data identifying the user added by the computing device.

13. The server according to claim 12, wherein in the event of the presence of the fixed third-party cookie, the controller is configured to receive the fixed value cookie from the browser via the communication unit, calculate a persistent third-party cookie in response to retrieving the fixed value cookie, and provide the persistent cookie to the browser, via the communication unit, for storage therein.

14. The server according to claim 13, wherein the persistent cookie includes information identifying the user of the browser.

15. The server according to claim 13, wherein the fixed value cookie contains information identifying the first-party domain from which the redirect occurred.

16. The server according to claim 15, wherein the controller is configured to count the number of occurrences of fixed value cookies associated with each of the first-party domains.

* * * * *